United States Patent
Gassoway

(10) Patent No.: US 8,402,278 B2
(45) Date of Patent: Mar. 19, 2013

(54) METHOD AND SYSTEM FOR PROTECTING DATA

(75) Inventor: Paul A. Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1078 days.

(21) Appl. No.: 11/735,147

(22) Filed: Apr. 13, 2007

(65) Prior Publication Data

US 2008/0253572 A1 Oct. 16, 2008

(51) Int. Cl.
*G06F 11/30* (2006.01)
*G06F 12/14* (2006.01)

(52) U.S. Cl. ............ 713/189; 713/182; 713/193; 726/2; 726/3; 726/4; 726/5; 726/6; 726/26; 726/27; 726/28; 726/29; 726/30

(58) Field of Classification Search .................. 713/193, 713/182, 189; 726/2–6, 26–30
See application file for complete search history.

(56) References Cited

U.S. PATENT DOCUMENTS

| | | | |
|---|---|---|---|
| 7,333,616 B1 * | 2/2008 | Brettle et al. ................. | 380/277 |
| 2001/0052074 A1 * | 12/2001 | Pensak et al. ................. | 713/167 |
| 2002/0023213 A1 * | 2/2002 | Walker et al. ................. | 713/168 |
| 2002/0112168 A1 * | 8/2002 | Filipi-Martin et al. ....... | 713/183 |
| 2003/0147267 A1 * | 8/2003 | Huttunen ........................ | 365/63 |
| 2004/0015724 A1 * | 1/2004 | Pham et al. ................... | 713/201 |
| 2005/0250473 A1 * | 11/2005 | Brown et al. ................. | 455/411 |
| 2006/0080536 A1 * | 4/2006 | Teppler .......................... | 713/176 |
| 2007/0058450 A1 * | 3/2007 | Ferren et al. ............. | 365/189.05 |
| 2007/0083935 A1 * | 4/2007 | Uchikawa et al. ............. | 726/26 |
| 2007/0106714 A1 * | 5/2007 | Rothbarth ...................... | 707/204 |
| 2007/0133803 A1 * | 6/2007 | Saito et al. .................... | 380/267 |
| 2007/0177740 A1 * | 8/2007 | Nakajima ...................... | 380/277 |
| 2007/0283446 A1 * | 12/2007 | Yami et al. .................... | 726/27 |
| 2008/0031458 A1 * | 2/2008 | Raja .............................. | 380/279 |
| 2008/0107262 A1 * | 5/2008 | Helfman et al. ............... | 380/44 |
| 2008/0107271 A1 * | 5/2008 | Mergen .......................... | 380/278 |
| 2008/0253572 A1 * | 10/2008 | Gassoway ...................... | 380/278 |

* cited by examiner

*Primary Examiner* — Eleni Shiferaw
*Assistant Examiner* — Jing Sims
(74) *Attorney, Agent, or Firm* — Baker Botts, L.L.P.

(57) ABSTRACT

The present invention is directed to a method and system for protecting data. In accordance with a particular embodiment of the present invention a new file is created. Key information is retrieved for the file from a keyserver. The key information includes, a key, a key identifier, and encryption algorithm information. The file is encrypted using the encryption algorithm. The key identifier is stored in a data repository. The data repository relates the key identifier to the encrypted file.

21 Claims, 2 Drawing Sheets

METHOD AND SYSTEM FOR PROTECTING DATA

TECHNICAL FIELD

The present disclosure relates generally to computer security, and more particularly to a method and system for protecting data.

BACKGROUND

Computer security has become increasingly more important, particularly in order to protect against data loss. Lost or stolen computers may result in compromised personal and private data of individuals or organizations. Because of the critical and potentially devastating loss of this highly sensitive data, these losses could expose individuals and organizations to a wide range of liability, fraud, and identify theft.

SUMMARY

In accordance with the present invention, the disadvantages and problems associated with previous techniques for protecting data may be reduced or eliminated.

In accordance with a particular embodiment or the present disclosure, a method for protecting data includes creating a new file. The method also includes retrieving key information for the file from a keyserver. The key information includes a key, a key identifier, and encryption algorithm information. The method further includes encrypting the file using the encryption algorithm. The method further includes storing the key identifier in a data repository. The data repository relates the key identifier to the encrypted file.

Technical advantages of particular embodiments of the present disclosure include a system and method for protecting data that provides protection against lost or stolen computers. For example, files on a laptop may be encrypted using keys stored on an organization's network. Thus, if the laptop is lost or stolen, the files would not be accessible outside the organization's network.

Further technical advantages of particular embodiments of the present disclosure include a system and method for protecting data that may encrypt a key exchange session. For example, a thief may install a network sniffer at an organization, and acquire the keys for a laptop or desktop from the organization. Using encrypted key exchange sessions would prevent the thief from acquiring the keys.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

With the advent of mobile computing, protecting data has become increasingly important. For example, data may be compromised if an employee of an organization takes data home on a laptop, and the laptop is inadvertently lost or stolen. Lost or stolen computers may create serious liability for the organization. Thus, there is a strong demand for products that allow organizations to control access to data on computers once the computers leave the organization's network.

In accordance with the teachings of the present disclosure, when a file is created on a client, such as a laptop, the file may be automatically encrypted using a key retrieved from a keyserver on the network. When the client is shut down or idle for a period of time, the key is lost. When the client is started, the client retrieves the key again from the keyserver, and may then decrypt the files. If the client is not on a network that can access the keyserver, the key cannot be obtained, and the files may not be accessed. Thus, the method provides data protection for lost or stolen computers. Additional details of example embodiments of the present disclosure are described in detail below.

Figure 1:
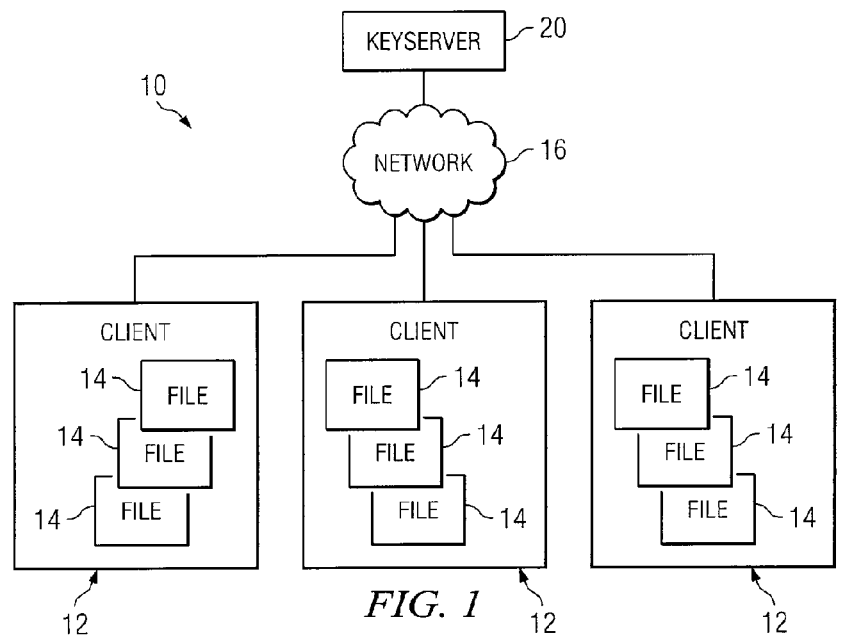
FIG. 1 is a block diagram illustrating a system for protecting data, according to the teachings of the present disclosure.

FIG. 1 is a block diagram illustrating a system 10 for protecting data, according to the teachings of the present disclosure. System 10 generally includes one or more clients 12 storing one or more files 14, a network 16, and a keyserver 20. According to the embodiment, when a file 14 is created at client 12, client 12 may retrieve key information from keyserver 20. The key information may comprise any suitable information for encrypting file 14, such as encryption algorithm information, a key, and a key ID. Once client 12 obtains the key, client 12 creates file 14 and stores the key and file information in a data repository, such as a database, that relates files to their respective keys.

Subsequently, when file 14 is accessed, client 12 may access the data repository to determine if file 14 is encrypted. If not, file 14 may be accessed. If file 14 is identified as encrypted, client 12 may suspend the access request to file 14 and attempt to retrieve the key associated with the file 14 from keyserver 20. If client 12 cannot retrieve the key, access to file 14 is denied.

Client 12 may refer to any suitable device operable store files 14. Client 12 may include, for example, a personal digital assistant, a computer such as a laptop, a cellular telephone, a mobile handset, or any other device operable to store file 14. Client 12 may include any operating system such as MS-DOS, PC-DOS, MAC-OS, WINDOWS, UNIX, OpenVMS, or other appropriate operating systems, including future operating systems.

File 14 may refer to any suitable data stored at client 12. For example, file 14 may be word processing file. File 14 may also include other data, such as a database, spreadsheet, text file, or any other suitable file.

Network 16 may refer to any interconnecting system capable of transmitting audio, video, signals, data, messages, or any combination of the preceding. Network 16 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Network 16 may utilize protocols and technologies to transmit information. Example protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

Keyserver 20 may refer to any suitable device operable to process requests from client 12. Examples of keyserver 20 may include a host computer, workstation, web server, file server, a personal computer such as a laptop, or any other device operable to process requests from client 12. Keyserver 20 may include any operating system such as MS-DOS, PC-DOS, MAC-OS, WINDOWS, UNIX, OpenVMS, or other appropriate operating systems, including future operating systems. Additional details of example embodiments of the disclosure are described in greater detail below in conjunction with portions of FIG. 2 and FIG. 3.

Figure 2:
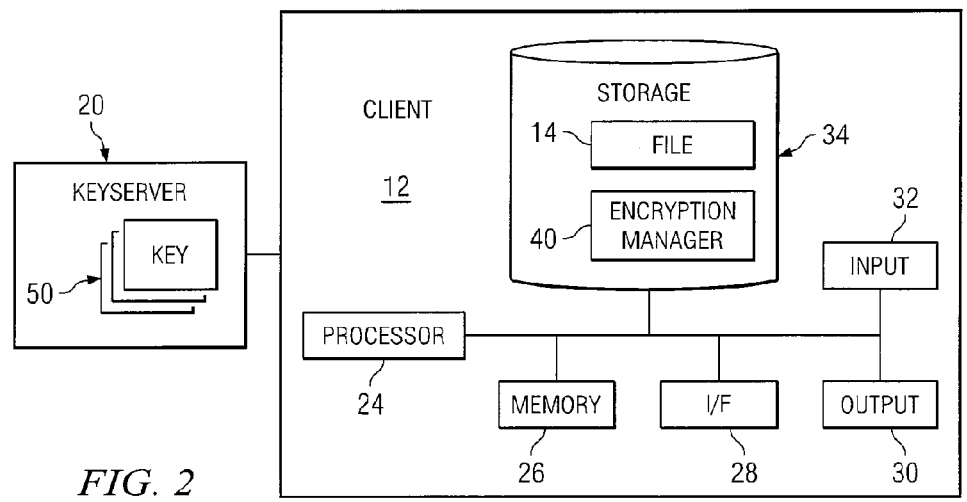
FIG. 2 is a block diagram illustrating an example client and an example keyserver of the system of FIG. 1, according to one embodiment of the present disclosure.

FIG. 2 is a block diagram illustrating an example client 12 and an example keyserver 20 of the system of FIG. 1, according to one embodiment of the present disclosure. In the illustrated embodiment, keyserver 20 includes key information 50 and client 12 includes a processor 24, a memory device 26, a communication interface 28, an output device 30, an input device 32, and a storage device 34. Storage device 34 includes file 14 and an encryption manager 40.

Encryption manager 40 may refer to any suitable logic embodied in computer-readable media, and when executed, that is operable to protect data, such as file 14, using key information 50 from keyserver 20. In the illustrated embodiment of the disclosure, encryption manager 40 resides in storage device 34. In other embodiments of the disclosure, encryption manager 40 may reside in memory device 26, or any other suitable device operable to store and facilitate retrieval of data and instructions.

According to one embodiment of the disclosure, encryption manager 40 may be operable to encrypt file 14 when file 14 is created. For example, when file 14 is created, encryption manager 40 may retrieve key information 50 from keyserver 20. Key information 50 may include, for example, encryption algorithm information, a key, and a key ID. Once encryption manager 40 obtains key information 50, encryption manager 40 allows file 14 to be created, encrypts file 14 using the key obtained from key information 50, and stores information identifying the key and file 14 in a data repository, such as a database on storage device 34.

Encryption manager 40 may be operable to decrypt file 14 when it is accessed. For example, when file 14 is accessed, encryption manager 40 may access the data repository to determine if file 14 is encrypted. If file 14 is not encrypted, file 14 may be accessed without being decrypted by encryption manager 40. If file 14 is identified as encrypted, encryption manager 40 may suspend the access request to file 14 and attempt to retrieve key information 50 associated with the file 14 from keyserver 20. If encryption manager 40 cannot retrieve key information 50 for file 14, access to file 14 is denied by encryption manager 40, or any other suitable logic operable to prevent access to file 14.

If encryption manager 40 retrieves key information 50, encryption manager 40 may decrypt file 14 using the key. In one embodiment, if file 14 is subsequently modified, encryption manager 40 may encrypt the modified file 14 using the same key. In other embodiments, encryption manager 40 may retrieve a new key to encrypt the modified file 14.

As described above, encryption manager 40 may store key information 50 and file 14 information in a data repository, such as a database, that relates files 14 to their respective keys. For example, encryption manager 40 may store a new entry in the data repository when file 14 is created. An entry in the data repository may include, for example, a file path for file 14 and a key ID for the key. As another example, encryption manager 40 may remove an entry in the data repository when file 14 is deleted. As yet another example, encryption manager 40 may update an entry if file 14 is renamed. In one embodiment, the data repository may be stored on storage device 34. In other embodiments, the data repository may reside in memory device 26, or any other suitable device operable to store and facilitate retrieval of data and instructions.

According to one embodiment of the disclosure, encryption manager 40 may access multiple keyservers 20 and may retrieve a different encryption algorithm for each file 14. For example, in one embodiment, when file 14 is created at client 12, encryption manager 40 may request default key information 50 from keyserver 20. In another embodiment, if client 12 is configured to use multiple keyservers 20, encryption manager 40 may request key information 50 from a random keyserver 20, and the random keyserver 20 may use a new encryption algorithm.

In one embodiment, encryption manager 40 may determine whether it supports a particular encryption algorithm when it requests default key information 50. If encryption manager 40 does not support the algorithm, it may request key information 50 for its strongest supported encryption algorithm. If keyserver 20 does not have key information 50 for that algorithm, keyserver 20 may return a negative response, which may cause encryption manager 40 to request the next strongest algorithm. In order to prevent the possibility that encryption manager 40 and keyserver 20 have no algorithm in common, encryption manager 40 and keyserver 20 may both support a common encryption algorithm, such as a Triple Data Encryption Standard (3DES) algorithm.

According to one embodiment of the disclosure, encryption manager 40 may cache default key information 50 for a finite length of time, after which it must request key information 50 again. Non-default key information 50 may be cached until client 12 is shut down or idle for a period of time. In one embodiment, encryption manager 40 may erase key information from a memory or cache if client 12 is restarted from a suspended mode. In the embodiment, key information 50 stored in memory may be encrypted using a hard-coded key (perhaps based on information that will not change during the life of the process), and any key information 50 erased from memory may be modified before the memory is freed to ensure that key information 50 cannot be recovered.

In one embodiment, the keys and their associated key IDs may be random. For example, if the key IDs are random, it may be possible to retrieve the associated key from a single keyserver 20. In the example, the key ID may be at least 32 bits, so there would need to be two billion keys to have a 50% chance that two keyservers 20 will have two different keys with the same key ID. Having random key IDs may prevent files 14 from being corrupted in the event that encryption manager 40 retrieves an incorrect key for a particular key ID. In other embodiments, keys may be copied between two keyservers 20 to provide load balancing.

According to one embodiment of the disclosure, encryption manager 40 and keyserver 20 may communicate over an encrypted communication session. For example, keyserver 20 may be configured such that it will only handle encrypted requests. Otherwise, keyserver 20 may handle encrypted requests only if encryption manager 40 encrypts the requests.

If encryption manager 40 is configured to encrypt requests, but keyserver 20 does not require encryption, the communication may be encrypted anyway. If encryption manager 40 is not configured to encrypt requests, and keyserver 20 requires encryption, encryption manager 40 may encrypt requests after receiving an error from keyserver 20.

Encryption manager 40 and keyserver 20 may communicate using any suitable protocol. For example, communication may occur over User Datagram Protocol (UDP) to maximize the scalability of keyserver 20.

In one embodiment, a request from encryption manager 40 may include one or more components. Any of the following components of the request may be encrypted once key information 50 is established. For example, the request may include a session ID, which may be used by keyserver 20 to determine which key to use for an encrypted communication. The request may also include a random request ID. The request ID may be echoed back to encryption manager 40 in a response so encryption manager 40 knows which request was responded to from keyserver 20. The request ID may be random to prevent another machine from sending spoofed responses.

The request may further include an operation. For example, the operation may include a 'get key' operation, but other operations may be used during a key exchange. The request may further include the data size. The data size may include any padding that may be added to the request to satisfy alignment requirements of the encryption algorithm. The request may further include the data associated with the operation. For example, in the case of a 'get key' operation, the data may contain the key ID of the key. The request may further include a hash of the entire decrypted request. The hash may be used in encrypted requests to determine if the decryption was performed correctly. Before the key is established, the hash may be ignored.

Similar to requests, responses may have the same format as the requests. The session ID, request ID and operations may match for encryption manager 40 to accept the response. For example, in the case of a 'get key' operation, the response may contain the requested key.

In one embodiment of operation, a key exchange between encryption manager 40 and keyserver 20 may be performed as follows. Encryption manager 40 sends an 'establish session' request, passing random data used to calculate the key, and −1 for the session ID to indicate an unencrypted session. Keyserver 20 generates random data, generates a session ID, and calculates the key. Keyserver 20 sends the random data back to client, so encryption manager 40 may generate its key. Encryption manager 40 may store the session ID for use in future requests.

In one embodiment, once a session has existed for at least 30 minutes, the session may be expired by keyserver 20. Keyserver 20 may record the IP address associated with the session, and if the IP address does not match the session ID, keyserver 20 may respond with an error. If key information 50 has not been established for this session, the error response may contain a session ID of −1 and a request ID of −1. Encryption manager 40 may then respond to this error by re-establishing its session. If encryption manager 40 does not get a response within the timeout, it may try the request again with a new request ID.

According to one embodiment of the disclosure, encryption manager 40 may be operable to provide a user interface. For example, it is possible that a user may demand that he be able to access his data while away from the network, and still desire the data protection. To provide this capability, encryption manager 40 may be operable to copy key information 50 of the appropriate keyserver 20 onto a portable storage medium, such as a Compact Disc (CD). However, this may increase the probability of data being compromised so appropriate measures to secure the CD may be appropriate.

According to one embodiment of the disclosure, the encryption/decryption of files 14 may be Federal Information Processing Standards (FIPS) compliant. For example, to perform encryption/decryption of the files, encryption manager 40 may use a file named 'fips.sys,' which is a driver provided by Microsoft that provides several different encryption algorithms to support FIPS compliant cryptography. Additional details of the other components of client 12 are described below.

Processor 24 may refer to any suitable device operable to execute instructions and manipulate data to perform operations for client 12. Processor 24 may include, for example, any type of central processing unit (CPU).

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input from keyserver 20, send output to keyserver 20, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows client 12 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device.

Storage device 34 may refer to any suitable device operable for storing data and instructions. Storage device 34 may include, for example, a magnetic disk, flash memory, or optical disk, or other suitable data storage device.

Figure 3:
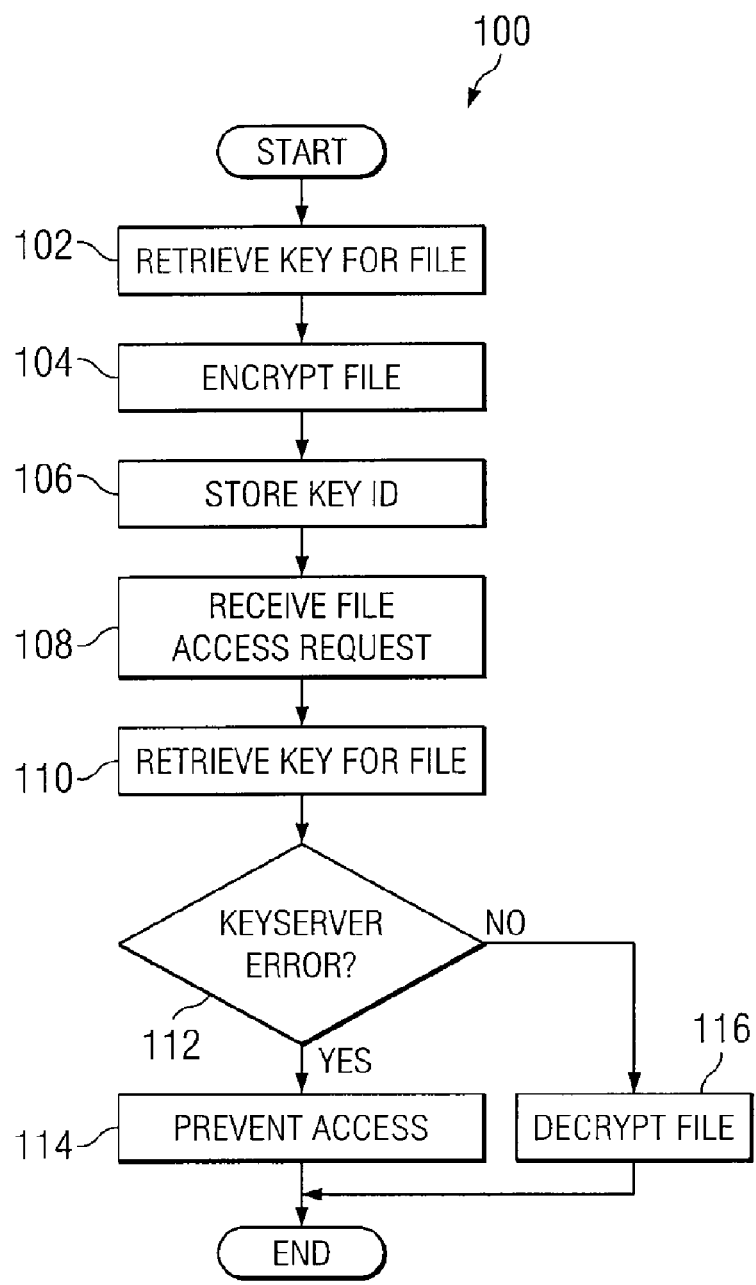
FIG. 3 is a flow diagram illustrating a method for protecting data, according to one embodiment of the present disclosure.

FIG. 3 is a flow diagram illustrating a method 100 for protecting data, according to one embodiment of the present disclosure. The method begins at step 102 where a client retrieves key information for a file. For example, the client may retrieve a key from a keyserver for a file that is new or recently modified. The key information may also include a key ID and encryption algorithm information. Next, at step 104, the file is encrypted using the encryption algorithm associated with the key.

At step 106, the client stores the key ID in a data repository, such as a database, that relates the file to its respective keys. An entry in the data repository may include, for example, a file path for a file and a key ID for the key.

The client may receive a request to access the file at step 108. For example, the client may be shut down or idle for a period of time, and the key is lost. Method 100 proceeds to step 110 to retrieve the key from the keyserver based on the key ID stored in the data repository. If the client receives an error at step 112, indicating a problem with accessing the key, method 100 proceeds to step 114 where access is prevented for the file. Otherwise, if the keyserver returns the key at step 112, method 100 proceeds to step 116 where the file is decrypted and access is allowed for the file.

Thus, the method described herein improves current methods to protect data. Data files of new or updated files on a client are encrypted with a key retrieved from a keyserver on a network. If the client is shut down or idle for a period of time, the key is lost. For subsequent requests to access the encrypted file, the client retrieves the key from the keyserver and decrypts the file. If the client is not on a network that can access the keyserver, the client cannot retrieve the key, and access to the file is denied. Thus, the method provides protection against lost or stolen computers, such as laptops.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for protecting data, comprising:
    receiving, by a client device, first key information from a first keyserver, the first keyserver selected at random from a plurality of keyservers associated with an organization, the first key information comprising first encryption algorithm information, a first key for encrypting a file, and a first key identifier of the first key;
    accessing and decrypting the file using the first key;
    modifying the file;
    deleting the first key from memory of the client device in response to a shut down, a restart, or an expiration of an idle timer;
    subsequent to deleting the first key from the memory of the client device, requesting second key information from a second keyserver, the second keyserver selected at random from the plurality of keyservers, the second key information comprising second encryption algorithm information, a second key, and a second key identifier; and
    encrypting the modified file using the second key.

2. The method of claim 1, wherein:
    the first encryption algorithm information describes an encryption algorithm supported by the first keyserver and the client device;
    the second encryption algorithm information describes an encryption algorithm supported by the second keyserver and the client device; and
    the first encryption algorithm differs from the second encryption algorithm.

3. The method of claim 1, wherein the second encryption algorithm information describes a strongest common encryption algorithm supported by the second keyserver and the client device, the strongest common encryption algorithm determined by:
    receiving an indicator of a strongest encryption algorithm supported by the second keyserver;
    determining that the client device does not support the strongest encryption algorithm supported by the second keyserver;
    sending an indicator of a strongest encryption algorithm supported by the client device; and
    if the second keyserver supports the strongest encryption algorithm supported by the client device, using the strongest encryption algorithm supported by the client device as the strongest common encryption algorithm;
    if the second keyserver does not support the strongest encryption algorithm supported by the client device, receiving an indicator of the next strongest algorithm supported by the second keyserver.

4. The method of claim 1, further comprising:
    subsequent to deleting the second key from the memory of the client device, requesting the second key from a keyserver other than the second keyserver, the other keyserver configured to facilitate load balancing by providing a copy of the second key to the client device.

5. The method of claim 1, further comprising establishing an encrypted communication session for communicating with the keyserver, wherein:
    a request communicated over the encrypted communication session comprises a session identifier and a random request identifier; and
    a response to the request communicated over the encrypted communication session comprises the same session identifier and the same random request identifier.

6. The method of claim 1, wherein the second key comprises a random key and the second key identifier comprises a random key identifier.

7. The method of claim 1, wherein the client device and each of the plurality of keyservers support a common encryption algorithm comprising Triple Data Encryption Standard (3DES) algorithm, the 3DES algorithm used as the second encryption algorithm if the client device and the second keyserver fail to negotiate a stronger encryption algorithm.

8. A system for protecting data, comprising:
    a client device comprising a processor configured to:
        receive first key information from a first keyserver, the first keyserver selected at random from a plurality of keyservers associated with an organization, the first key information comprising first encryption algorithm information, a first key for encrypting a file, and a first key identifier relating the first key to the file;
        access the file using the first key;
        modify the file;
        delete the first key from memory of the client device in response to a shut down, a restart, or an expiration of an idle timer;
        subsequent to deleting the first key from the memory of the client device, request second key information from a second keyserver, the second keyserver selected at random from the plurality of keyservers, the second key information comprising second encryption algorithm information, a second key, and a second key identifier; and
        encrypt the modified file using the second key.

9. The system of claim 8, wherein:
    the first encryption algorithm information describes an encryption algorithm supported by the first keyserver and the client device;
    the second encryption algorithm information describes an encryption algorithm supported by the second keyserver and the client device; and
    the first encryption algorithm differs from the second encryption algorithm.

10. The system of claim 8, wherein the second encryption algorithm information describes a strongest common encryption algorithm supported by the second keyserver and the client device, the strongest common encryption algorithm determined by:
    receiving an indicator of a strongest encryption algorithm supported by the second keyserver;

determining that the client device does not support the strongest encryption algorithm supported by the second keyserver;

sending an indicator of a strongest encryption algorithm supported by the client device; and if the second keyserver supports the strongest encryption algorithm supported by the client device, using the strongest encryption algorithm supported by the client device as the strongest common encryption algorithm;

if the second keyserver does not support the strongest encryption algorithm supported by the client device, receiving an indicator of the next strongest algorithm supported by the second keyserver.

11. The system of claim 8, the processor further configured to subsequent to deleting the second key from the memory of the client device, request the second key from a keyserver other than the second keyserver, the other keyserver configured to facilitate load balancing by providing a copy of the second key to the client device.

12. The system of claim 8, the processor further configured to establish an encrypted communication session for communicating with the keyserver, wherein:

a request communicated over the encrypted communication session comprises a session identifier and a random request identifier; and a response to the request communicated over the encrypted communication session comprises the same session identifier and the same random request identifier.

13. The system of claim 8, the second key comprises a random key and the second key identifier comprises a random key identifier.

14. The system of claim 8, wherein the client device and each of the plurality of keyservers support a common encryption algorithm comprising a Triple Data Encryption Standard (3DES) algorithm, the 3DES algorithm used as the second encryption algorithm if the client device and the second keyserver fail to negotiate a stronger encryption algorithm.

15. Logic encoded and stored in non-transitory media, the logic when executed by a processor, causes the processor to:

receive first key information from a first keyserver, the first keyserver selected at random from a plurality of keyservers associated with an organization, the first key information comprising first encryption algorithm information, a first key for encrypting a file, and a first key identifier relating the first key to the file;

access, by a client, the file using the first key;

modify the file;

delete the first key from memory of the client device in response to a shut down, a restart, or an expiration of an idle timer;

subsequent to deleting the first key from the memory of the client device, request second key information from a second keyserver, the second keyserver selected at random from the plurality of keyservers, the second key information comprising second encryption algorithm information, a second key, and a second key identifier; and encrypt the modified file using the second key.

16. The logic of claim 15, wherein:

the first encryption algorithm information describes an encryption algorithm supported by the first keyserver and the client;

the second encryption algorithm information describes an encryption algorithm supported by the second keyserver and the client; and the first encryption algorithm differs from the second encryption algorithm.

17. The logic of claim 15, wherein the second encryption algorithm information describes a strongest common encryption algorithm supported by the second keyserver and the client, the strongest common encryption algorithm determined by:

receiving an indicator of a strongest encryption algorithm supported by the second keyserver;

determining that the client does not support the strongest encryption algorithm supported by the second keyserver;

sending an indicator of a strongest encryption algorithm supported by the client; and if the second keyserver supports the strongest encryption algorithm supported by the client, using the strongest encryption algorithm supported by the client as the strongest common encryption algorithm;

if the second keyserver does not support the strongest encryption algorithm supported by the client, receiving an indicator of the next strongest algorithm supported by the second keyserver.

18. The logic of claim 15, the logic further configured to subsequent to deleting the second key from the memory of the client, request the second key from a keyserver other than the second keyserver, the other keyserver configured to facilitate load balancing by providing a copy of the second key to the client.

19. The logic of claim 15, the logic further configured to establish an encrypted communication session for communicating with the keyserver, wherein:

a request communicated over the encrypted communication session comprises a session identifier and a random request identifier; and a response to the request communicated over the encrypted communication session comprises the same session identifier and the same random request identifier.

20. The logic of claim 15, wherein the second key comprises a random key and the second key identifier comprises a random key identifier.

21. The logic of claim 15, wherein the client and each of the plurality of keyservers support a common encryption algorithm comprising a Triple Data Encryption Standard (3DES) algorithm, the 3DES algorithm used as the second encryption algorithm if the client and the second keyserver fail to negotiate a stronger encryption algorithm.

* * * * *